United States Patent
Kim et al.

(10) Patent No.: US 9,131,359 B2
(45) Date of Patent: Sep. 8, 2015

(54) METHOD FOR REMOTELY CONTROLLING PORTABLE TERMINAL AND SYSTEM THEREFOR

(75) Inventors: Tae Kyoung Kim, Daejeon (KR); In Hyung Jung, Gumi-si (KR); Sung Yong Kim, Gumi-si (KR); Sang Ha Lee, Daegu (KR); Young Woo Son, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1080 days.

(21) Appl. No.: 12/565,362

(22) Filed: Sep. 23, 2009

(65) Prior Publication Data

US 2010/0087165 A1    Apr. 8, 2010

(30) Foreign Application Priority Data

Oct. 2, 2008    (KR) ........................ 10-2008-0097343

(51) Int. Cl.
*H04M 3/00*     (2006.01)
*H04W 8/22*     (2009.01)
*H04W 8/24*     (2009.01)

(52) U.S. Cl.
CPC ................ *H04W 8/22* (2013.01); *H04W 8/245* (2013.01)

(58) Field of Classification Search
CPC ............ H04W 8/14; H04W 8/20; H04W 8/24
USPC ................. 455/420, 417, 419; 379/74, 88.01, 379/102.01, 102.02, 102.07, 210.02, 379/211.02; 340/539.13, 539.17, 4.11
See application file for complete search history.

(56) References Cited

U.S. PATENT DOCUMENTS

| | | | |
|---|---|---|---|
| 6,295,447 B1* | 9/2001 | Reichelt et al. ............... | 455/417 |
| 6,301,484 B1* | 10/2001 | Rogers et al. .................. | 455/466 |
| 6,735,433 B1* | 5/2004 | Cervantes ...................... | 455/417 |
| 6,741,851 B1* | 5/2004 | Lee et al. ....................... | 455/410 |
| 6,754,484 B1* | 6/2004 | Hiltunen et al. ............ | 455/412.1 |
| 7,043,263 B2* | 5/2006 | Kaplan et al. ................. | 455/466 |
| 7,505,763 B2* | 3/2009 | Rodriguez et al. ............ | 455/420 |
| 7,606,585 B2* | 10/2009 | Suan ............................. | 455/466 |
| 7,653,383 B2* | 1/2010 | Natarajan ..................... | 455/419 |
| 7,899,447 B2* | 3/2011 | Takuno et al. ................ | 455/418 |
| 2001/0055964 A1* | 12/2001 | Karhu ........................... | 455/419 |
| 2003/0003907 A1* | 1/2003 | Lai et al. ....................... | 455/425 |
| 2003/0078032 A1* | 4/2003 | Pei et al. ....................... | 455/411 |
| 2004/0198335 A1* | 10/2004 | Campen ........................ | 455/419 |
| 2004/0203601 A1* | 10/2004 | Morriss et al. ................ | 455/411 |
| 2004/0235424 A1* | 11/2004 | Kim ................................ | 455/68 |
| 2004/0248563 A1* | 12/2004 | Ayers et al. ................... | 455/417 |

(Continued)

FOREIGN PATENT DOCUMENTS

| KR | 10-0735328 B1 | 7/2007 |
|---|---|---|
| KR | 10-2007-0093743 A | 9/2007 |
| KR | 1020070093743 A | 9/2007 |

*Primary Examiner* — Keith Fang
(74) *Attorney, Agent, or Firm* — Jefferson IP Law, LLP (57) ABSTRACT

The present invention relates to a remote control of a portable terminal, and more particularly, to a method for remotely controlling functions of a portable terminal, and a system thereof. A method for remotely controlling a function of a portable terminal includes receiving a request for remote control of at least one function of the portable terminal, setting up the requested at least one function for remote control, determining whether an event corresponding to the set up function is generated and performing the set up function if the event is generated.

15 Claims, 7 Drawing Sheets

(56) References Cited

U.S. PATENT DOCUMENTS

| | | |
|---|---|---|
| 2005/0164687 A1* | 7/2005 | DiFazio .................. 455/418 |
| 2006/0030339 A1* | 2/2006 | Zhovnirovsky et al. ... 455/456.6 |
| 2006/0099977 A1* | 5/2006 | Lai et al. ................. 455/466 |
| 2006/0178161 A1* | 8/2006 | Jung ....................... 455/518 |
| 2007/0032225 A1 | 2/2007 | Konicek et al. |
| 2007/0190995 A1* | 8/2007 | Wang et al. ............. 455/419 |
| 2007/0259657 A1* | 11/2007 | Cheng ..................... 455/419 |
| 2008/0003979 A1* | 1/2008 | Jang et al. ............... 455/410 |
| 2008/0153476 A1* | 6/2008 | Jang ........................ 455/420 |
| 2008/0200192 A1 | 8/2008 | Harris |
| 2009/0069002 A1* | 3/2009 | Shin ........................ 455/419 |
| 2009/0104888 A1* | 4/2009 | Cox ......................... 455/410 |

\* cited by examiner

METHOD FOR REMOTELY CONTROLLING PORTABLE TERMINAL AND SYSTEM THEREFOR

PRIORITY

This application claims the benefit under 35 U.S.C. §119(a) of a Korean patent application filed in the Korean Intellectual Property Office on Oct. 2, 2008 and assigned Serial No. 10-2008-0097343, the entire disclosure of which is hereby incorporated by reference.

BACKGROUND OF THE INVENTION

1. Field of the Invention

The present invention relates to remote control of a portable terminal. More particularly, the present invention relates to a method for remotely controlling functions of a portable terminal, and a system therefor.

2. Description of the Related Art

As portable terminals are becoming more widely used due to their portability and user convenience, functions performed by a portable terminal are also being rapidly increased based on the rapid development of supporting technology. Functions provided by a portable terminal vary widely. For example, a portable terminal includes not only a mobile communication function, which provides a simple voice communication function, and a packet communication function, such as text or multimedia communication, but also a user information management function including a phone book function or a schedule management function. Due to such advantages, the portable terminal continues to gain popularity. However, such advantages of the portable terminal can cause an inconvenience or even a problem for a user in certain circumstances. For example, if a user misplaces or even loses the portable terminal, various problems may occur such as theft of user information stored on the portable terminal or excessive use of service if the portable terminal is found by a malicious user. Moreover, as the portable terminal is depended on more frequently to support the activities in the daily life of the user, even if the portable terminal is not lost, if the user is unable to use the portable terminal for a certain time, for example, in the case the portable terminal is left at home when coming to the office or left in a visited place, it is disadvantageous in that the user is unable to use the functions of the portable terminal such as placing or taking a phone call or receiving or sending a text message. Accordingly, there is a need to address the various problems which are caused when a user is unable to access their portable terminal due to, for example, not carrying or losing the portable terminal.

SUMMARY OF THE INVENTION

An aspect of the present invention is to address at least the above-mentioned problems and/or disadvantages and to provide at least the advantages described below. Accordingly, an aspect of the present invention is to provide a method for remotely controlling a function of a portable terminal and system therefor.

In accordance with an aspect of the present invention, a method for remotely controlling a function of a portable terminal is provided. The method includes receiving a request for remote control of at least one function of the portable terminal, setting up the requested at least one function for remote control, determining whether an event corresponding to the set up function is generated, and performing the set up function if the event is generated.

In accordance with another aspect of the present invention, a system for remotely controlling a function of a portable terminal is provided. The system includes a slave terminal for receiving a request for remote control of at least one function of the slave terminal, for setting up the requested at least one function for remote control, for determining whether an event corresponding to the set up function is generated, and for performing the set up function if the event is generated, and a master terminal for remotely controlling a function of the slave terminal.

Exemplary embodiments of the present invention are able to remotely control a function of a portable terminal in which a remote control function is set up by another preset terminal. Accordingly, it has an advantage that security and user friendliness can be promoted. Moreover, exemplary embodiments of the present invention are able to remotely control a forwarding function about various kinds of messages or a given condition and various kinds of call barring functions. Moreover, exemplary embodiments of the present invention are able to control by a terminal which is preset as a remote control terminal through authentication such that problems such as malicious use by a finder of the lost portable terminal can be prevented.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the of the present invention will be more apparent from the following description in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention can perform a desired function or provide a service from another terminal by remotely controlling a portable terminal which is missing or is otherwise not carried by a user. Hereinafter, a method based on a mobile tracker function is exemplified as a technology for remotely controlling a portable terminal. The mobile tracker function is a function for transmitting a message to another preset terminal when a Subscriber Identification Module (SIM) is altered, if a portable terminal which operates a mobile tracker function is missing.

The mobile tracker function is illustrated in the description below. However, it should be noted that the remote control method for functions applied in the present invention is not limited to the mobile tracker function. That is, an exemplary method for remotely controlling the function of a portable terminal using the mobile tracker function is illustrated with reference to drawings and should not be construed as limiting.

Figure 1:
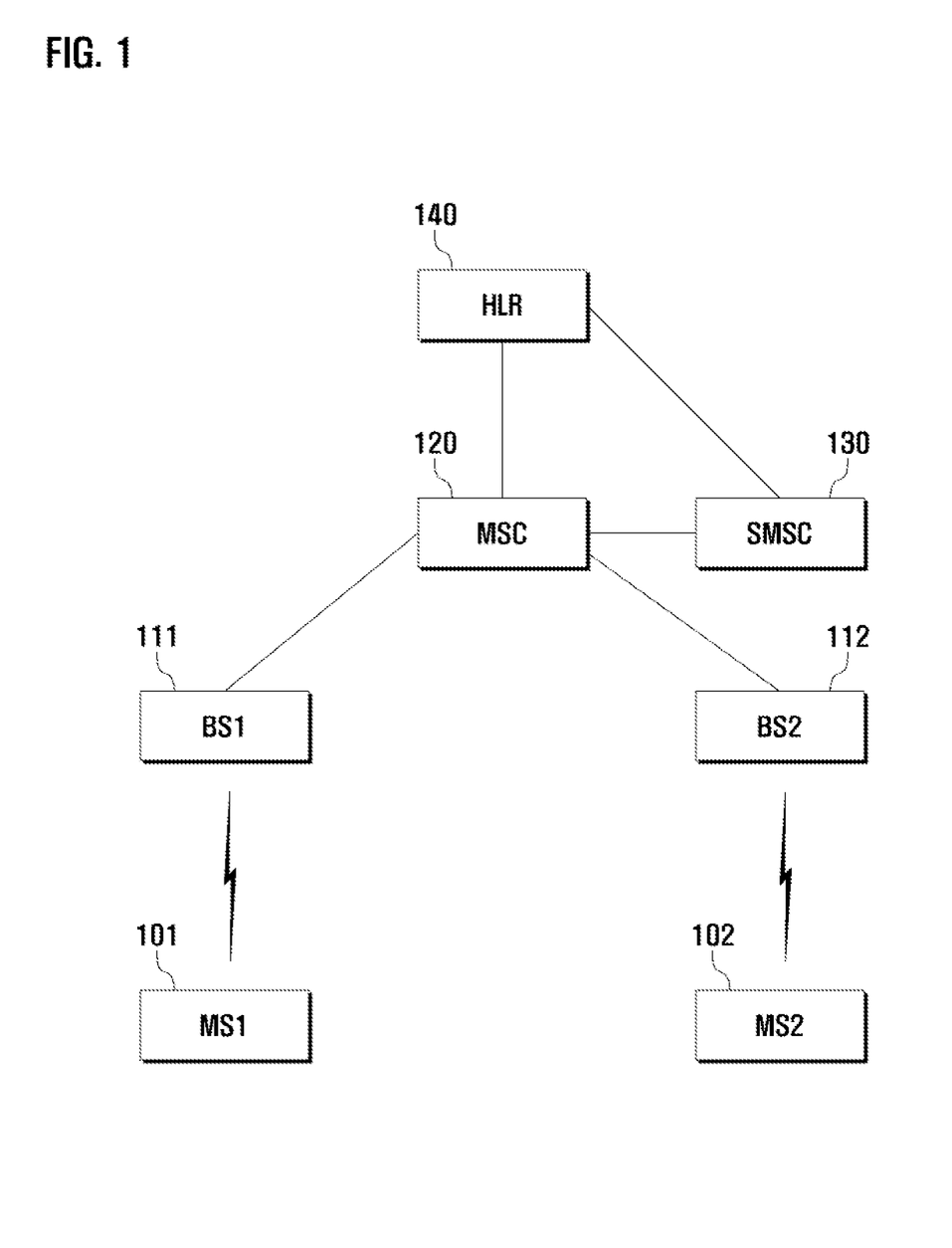
FIG. 1 illustrates a system for remotely controlling a function of a portable terminal according to an exemplary embodiment of the present invention.

FIG. 1 illustrates a system for remotely controlling a function of a portable terminal according to an exemplary embodiment of the present invention.

In the following description, it is assumed that the mobile tracker function is used for remote control and that a message transmitted and received between a slave terminal and a master terminal is a Short Message Service (hereinafter, 'SMS') message. Accordingly, in FIG. 1, a mobile communication system structure for transmitting an SMS message is illustrated. However, the remote control method can be performed by other remote control methods besides the mobile tracker function, and a message can be transmitted with other message formats which are not an SMS message. In a case where a message is transmitted with another message format, it can be performed by another network which is not a mobile communications network. In a case where another network is used, the system architecture of FIG. 1 can be altered without deviating from the inventive concepts of the present invention.

Referring to FIG. 1, a Mobile Station 1 (hereinafter, MS1) 101 is a portable terminal in which the remote control function is set up. The MS1 101 can be a slave terminal, while a Mobile Station 2 (MS2) 102, which remotely controls the MS1 101, can be a master terminal. A Base Station 1 (hereinafter, BS1) 111 and a Base Station 2 (BS2) 112 are base stations managing the MS1 101 and MS2 102 respectively. In another exemplary implementation, if the MS1 101 and MS2 102 are positioned in the same cell, they can be managed by one base station. The BS1 111 and the BS2 112 are respectively connected to the MS1 101 and the MS2 102 through a wireless link and perform communication with the MS1 101 and the MS2 102. A Mobile Switching Center (MSC) 120 processes a signal transmitted and received from the BS1 111 or the BS2 112, and generally controls base stations. If necessary, the MSC 120 makes inquiries regarding the location of the MS1 101 or the MS2 102 to a Home Location Register (HLR) 140.

A Short Message Service Center (SMSC) 130 is connected to the HLR 140 and the MSC 120. The SMSC 130 determines the location of the MS1 101 or the MS2 102 and sends an SMS message to a user of the mobile terminal. In case an SMS message is requested to be transmitted to a mobile terminal of a receiving side which temporarily cannot receive the message, the SMSC 130 can store it for a given time and forward it later. If the SMS message for the remote control function is transmitted from the MS1 101 or the MS2 102, the BS1 111 or the BS2 112 that received the SMS message transmits the SMS message to the MSC 120, and the MSC 120 transmits it to the SMSC 130. The SMSC 130 determines whether the recipient of the received SMS message, that is, the MS1 101 or the MS2 102, is available for receiving the message, and transmits the received SMS message to the recipient if the recipient is available. The HLR 140 stores subscriber information such as the position of mobile terminal users. Here, a mobile communication terminal is exemplified as the MS1 101 and the MS2 102. However, it is obvious that the mobile communication terminal may include a Personal Data Assistance (PDA), a smart phone and the like for either or both the MS1 101 and the MS2 102.

Figure 2:
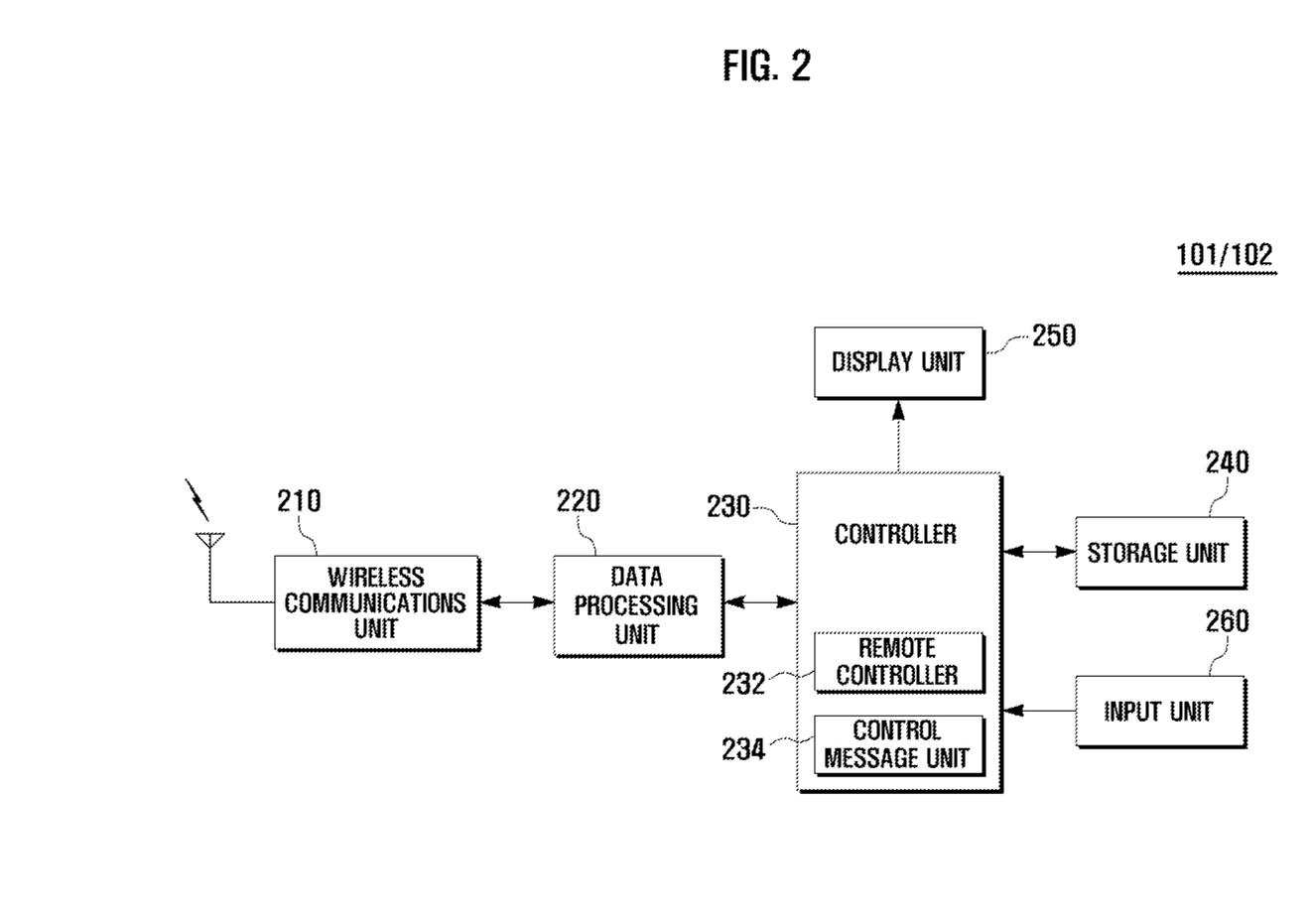
FIG. 2 is a block diagram illustrating a configuration of a portable terminal according to an exemplary embodiment of the present invention.

FIG. 2 is a block diagram illustrating a configuration of a portable terminal according to an exemplary embodiment of the present invention. The portable terminal illustrated in FIG. 2 can be the MS1 101 or the MS2 102 of FIG. 1.

Referring to FIG. 2, a wireless communications unit 210 performs a wireless communication between a serving BS (e.g. the BS1 111 or the BS2 112 of FIG. 1) and the portable terminal (e.g. the portable terminal MS1 101 or MS2 102 of FIG. 1). More particularly, the wireless communications unit 210 sends and receives a message for the remote control. The wireless communications unit 210 includes a frequency transmission unit which up-converts and amplifies the frequency of a transmitted signal and a frequency receiving unit which low-noise amplifies a received signal and down-converts the frequency.

A data processing unit 220 processes data received from the wireless communications unit 210 or from a controller 230. Moreover, the data processing unit 220 includes a transmission unit which encodes and modulates a signal to be transmitted through the wireless communications unit 210 and a receiving unit which demodulates and decodes a signal received through the wireless communications unit 210. That is, the data processing unit 220 includes a MOdulator/DEModulator (MODEM) and a Coder/DECoder (CODEC). The controller 230 controls the overall operation of the portable terminal MS1 101 or MS2 102 as well as signal flows between internal blocks of the portable terminal MS1 101 or MS2 102.

In an exemplary embodiment, the controller 230 executes the functions of the data processing unit 220 such that there is not a separate data processing unit provided. Moreover, the controller 230 can include a remote controller 232 for performing the remote control function and a control message unit 234 which generates and analyzes a remote control message.

With respect to the MS1 101 of FIG. 1, the remote controller 232 sets up the remote control function. The remote controller 232 also determines whether a received message is a message for remote control or a general SMS message, if a message is received. In addition, the remote controller 232 determines whether information of a preset remote control function is identical with remote control function information included in the received message and performs a corresponding remote control function in a case of coincidence. The function of the remote controller 232 and the control message unit 234 can be different depending on whether the remote controller 232 and the control message unit 234 are equipped in the MS1 101 or the MS2 102 of FIG. 1.

For example, if the remote controller 232, equipped in the MS2 102, requests that a function be controlled remotely, the control message unit 234 generates a message to this effect. The remote controller 232 equipped in the MS1 101 sets up a remote control for a corresponding function according to information included in the remote control message received from the MS2 102. The control message unit 234 extracts information included in the received remote control message after analyzing the received remote control message. Moreover, in a case where a message informs of a change of recipient, a message informing of the change of recipient is generated by the control message unit 234 of the MS1 101, while the received message is confirmed as a message informing of the change of recipient by the control message unit 234 of the MS2 102 receiving the message. A more detailed description of the remote control function will be described later with reference to FIGS. 3 to 7.

The storage unit 240 stores application programs and various data necessary for performing functions of the portable terminal MS1 101 or MS2 102. Moreover, the storage unit 240 can store information about the remote control function. The display unit 250 displays various data which is generated during operation of the portable terminal, and indicates an operation status corresponding to a key input made by a user. The display unit 250 may include a Liquid Crystal Display (hereinafter, 'LCD') and the display unit 250 can perform the function of the input unit 260 in a case where the LCD is implemented in the form of a touch screen. The input unit 260 receives number and character information and sends a signal which is input in connection with the setting of various functions and the function control of the portable terminal MS1 101 or MS2 102 to the controller 230. Moreover, according to the type of the portable terminal MS1 101 or MS2 102, the input unit 260 can be formed with a touch pad, a general key arrangement, or any combination thereof. Although not shown in FIG. 2, the SIM card including user identification information of the portable terminal MS1 101 or MS2 102 can be mounted within the portable terminal. In a case where the SIM card is mounted within the portable terminal, the controller 230 may know of the generation of a lost event by determining a change of the SIM card.

Figure 3:
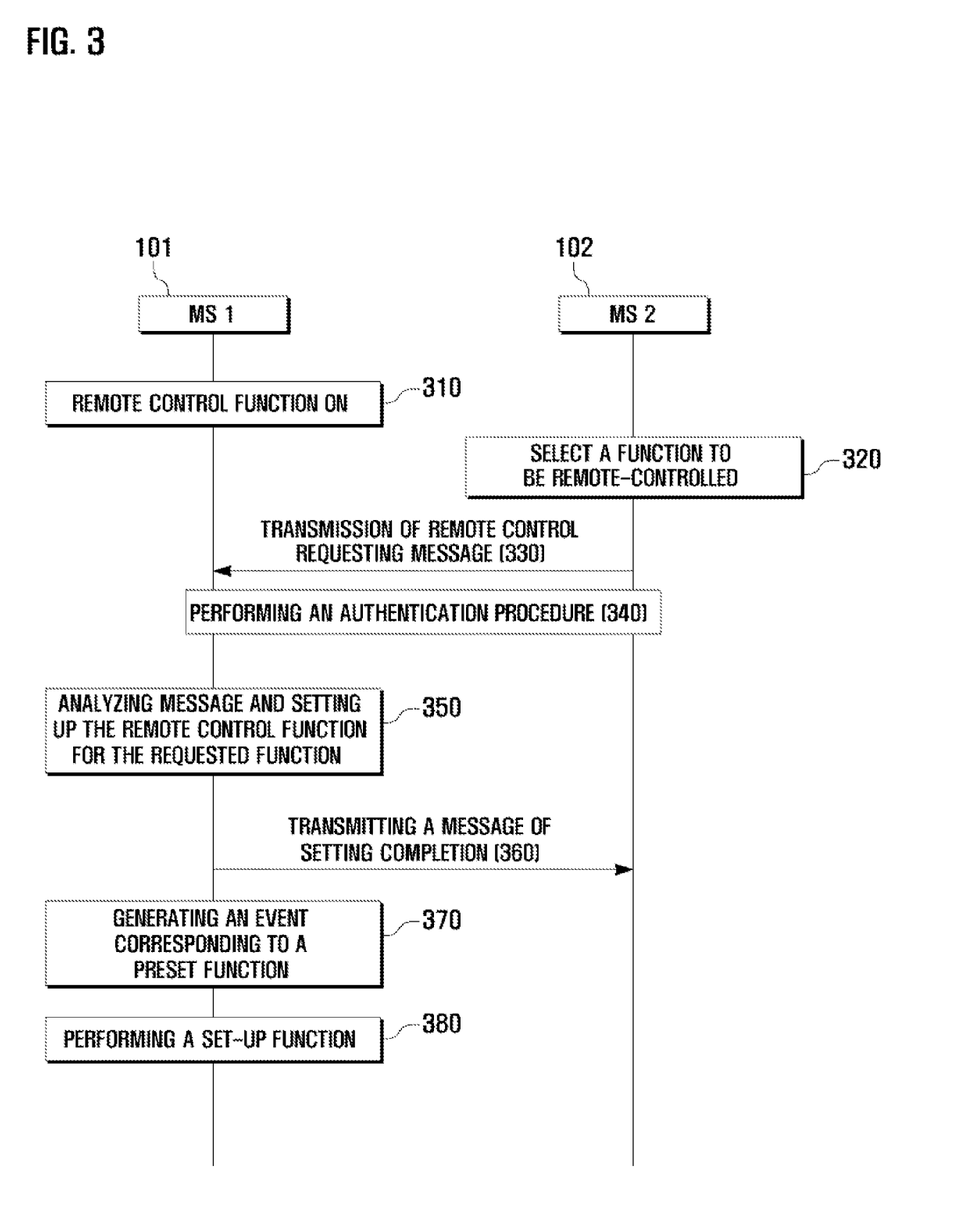
FIG. 3 is a flowchart illustrating a procedure for remotely controlling a function of a portable terminal according to an exemplary embodiment of the present invention.

FIG. 3 is a flowchart illustrating a procedure for remotely controlling a function of a portable terminal according to an exemplary embodiment of the present invention.

Referring to FIG. 3, it is assumed that the MS1 101 of FIG. 1 is a slave terminal in which the remote control function is set up, while the MS2 102 is a master terminal which remotely controls the function of the MS1 101. That is, the MS1 101 is a remotely controlled portable terminal and the MS2 102 is a terminal manipulated by a user so as to control the MS1 101. Moreover, in the remote control function which is set up in the slave terminal, it is assumed that the MS2 102 is set up using the telephone number of the MS2 102 as a message recipient. An exemplary process of setting up a remote control function and an exemplary process of altering the recipient are described later with reference to FIGS. 6 and 7.

The remote control function of the MS1 101 is turned on in step 310). In an exemplary embodiment, the remote control function of the MS1 101 is turned on at the MS1 101 by a user, such as through a function setting menu. The MS2 102 selects a function to be remote-controlled so as to remotely control the corresponding function of the MS1 101 in step 320. Here, the selection of the function to be remote-controlled can be performed by a user input made through the input unit 260 of FIG. 2. At this time, the MS2 102 can request a list of functions which can be provided by the MS1 101 for the function selection and can select, from a received list after receiving the list, a corresponding function from the MS1 101. The function to be remote-controlled is a function which can be performed in the MS2 102 among functions provided by the MS1 101. For example, the function to be remote-controlled may include a call barring function, a call forwarding function, and the like. The remote control setting of the function is described in more detail with reference to FIG. 4.

The MS2 102 transmits a message to the MS1 101 requesting to perform the selected remote control function in step 330. In an exemplary implementation, the information can be transmitted with an SMS message. The MS1 101 and the MS2 102 perform an authentication procedure in step 340. In an exemplary authentication procedure, the MS1 101 requests the MS2 102 to provide an authentication number such as a password. If the authentication number input from the MS2 102 is received, it is determined whether the input authentication number coincides with the authentication number that has been previously stored in the MS1 101. If the authentication numbers coincide, the MS1 101 performs a process for setting up a remote control of the function requested from the MS2 102. On the other hand, if the authentication numbers do not coincide, a message which informs that the authentication number is inconsistent is transmitted to the MS2 102. At this time, the request for the authentication number to the MS2 102 can be performed one time or the re-inquiry of the authentication number can be performed a number of times which is set in advance. Moreover, the authentication procedure can be performed using authentication information included in the message transmitted at step 330. That is, the MS1 101 can determine the authentication of the MS2 102 by determining the coincidence of a password, included in the received message (i.e., the authentication number), with the authentication number stored in advance. In FIG. 3, it is assumed that the authentication numbers coincide with each other so that the authentication of step 330 is successful. Accordingly, the MS1 101 sets up the remote control function for the requested function in step 350 after analyzing the received message which includes information about the requested function. Here, the message analysis is used to determine the information about the function to be remote-controlled which is included in the received message. This is possible on the assumption that the received message is a message for remote control. In the receipt of a message, it is determined whether the received message is a message for remote control or a general SMS message. That is, before performing the authentication procedure of step 340, the MS1 101 can determine whether the received message is a message for remote control. In an exemplary embodiment, the MS1 101 and MS2 102 can classify a message as either a message for remote control or a general SMS message with a preset protocol. After analyzing the message, the MS1 101 sets up remote control for the requested function included in the message. For example, in a case where the requested function included in the received message is a remote control request for barring a call, the type of the call for barring is determined. The type of the call barring can include an outgoing call barring that the MS1 101 sends, an international call barring, an incoming call barring, and a roaming barring.

Moreover, in a case where the requested function included in the received message is a remote control request for a call forwarding function, the type of call or message which requests forwarding and the information of the terminal which requests the forwarding are determined. The type of a call or message which requests forwarding can include a call, an SMS message, and a Multimedia Messaging Service (hereinafter, 'MMS') message. A more detailed description will be provided later with reference to FIG. 4. The MS1 101 transmits a message, which informs that the remote control function setting for the requested function is completed, to the MS2 102 in step 360. At this time, in a case where the requested function is the forwarding function, the message forwarding function is set. In an exemplary embodiment, if forwarding of messages which are previously received and stored is also requested, such corresponding messages are sent to the MS2 102. In step 370, the MS1 101 senses the generation of an event corresponding to a preset function. For example, when the call barring function is set, in a case where a call barring event is generated, that is, in a case where the call barring is set, a request for call originating can be generated, or in a case where the incoming call barring is set, a call receipt can be generated.

Alternatively, in a case where the message forwarding function is set, a message corresponding to a set up message type can be received. In this case, when a message corresponding to a preset function, for example, the barring of an outgoing call or the barring of an incoming call, or the type of the set up message is received, the MS1 101 sends the received message to the recipient by using recipient information stored in advance in step 380. In this way, in a case of losing or not carrying a portable terminal, the user can control the function of the terminal by using another terminal set up in advance.

Figure 4:
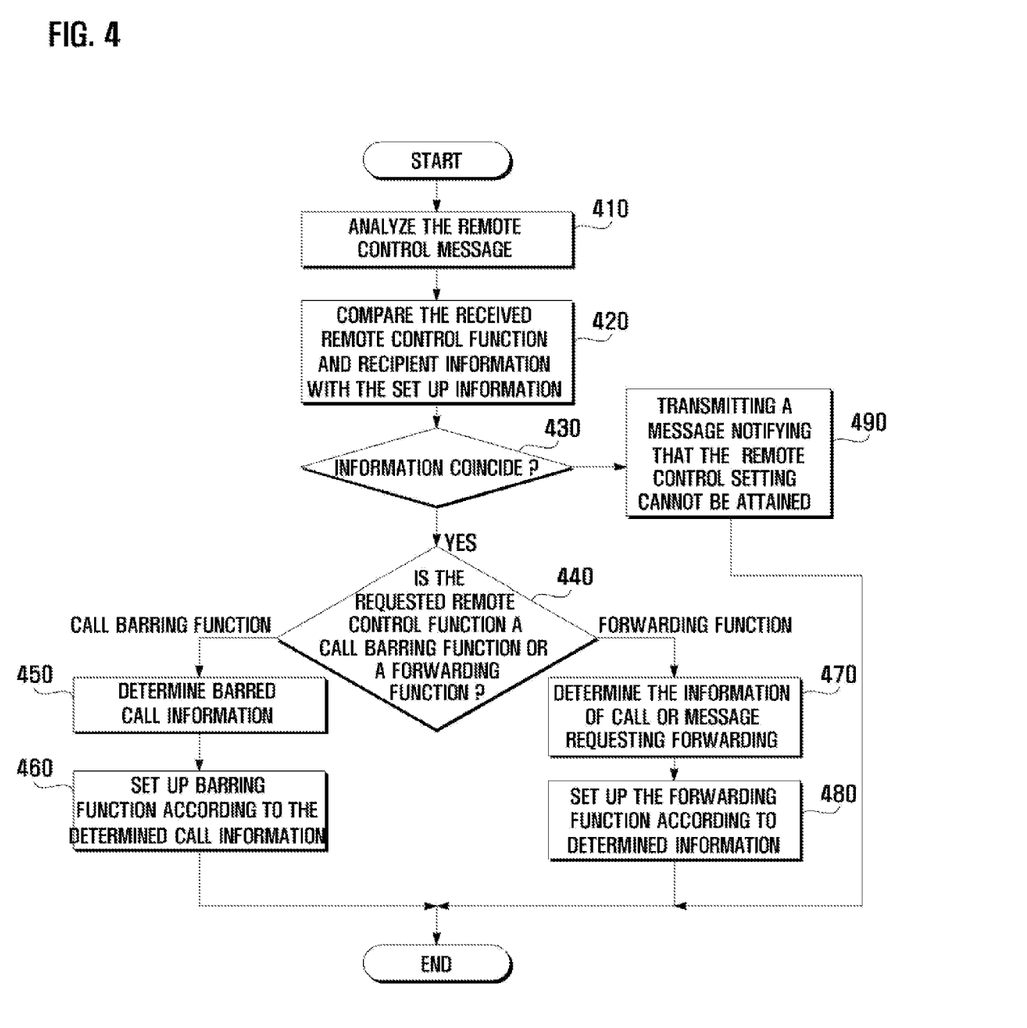
FIG. 4 is a flowchart illustrating a remote control function setup procedure according to an exemplary embodiment of the present invention.

FIG. 4 is a flowchart illustrating a remote control function setup procedure according to an exemplary embodiment of the present invention.

In FIG. 4, the process of setting up the remote control for a function which is requested after the analysis of the message at step 350 of FIG. 3 is illustrated in more detail. Referring to FIG. 4, the MS1 101 of FIGS. 2 and 3, more particularly, the control message unit 234, analyzes the remote control message in step 410. In an exemplary implementation, the analysis of the remote control message includes determining if a request for remote control is included in the message and extracting information of the requested function. The extracted information may include information regarding the type of requested function and the recipient. The MS1 101, more particularly, the remote controller 232 compares the requested remote control function and recipient information with the remote control function and recipient information set up in the MS1 101 in step 420. In step 430, the remote controller 232 determines whether the extracted information coincides with the set information as a result of comparison, and proceeds to step 440 if it is determined that the information coincides. Otherwise, if it is determined that the information does not coincide, the remote controller 232 proceeds to step 490 so that a message notifying that the requested remote control function cannot be attained is transmitted to the MS2 102. At this time, the remote control message notifying that the remote control function cannot be attained can be configured as an SMS message. The SMS message format follows the international standard, and generally one SMS message can be configured having a user data field of 140 bytes. After transmitting the message in step 490, the exemplary procedure ends.

On the other hand, if it is determined in step 430 that the information does coincide, the remote controller 232 determines whether the requested remote control function is a call barring function or a forwarding function in step 440. Here, for the sake of convenience and conciseness, only the call barring function and forwarding function are described. However, the remote control function of the present invention is not limited to the call barring function or the forwarding function. If it is determined that the requested function is a call barring function, the remote controller 232 proceeds to step 450. Alternatively, the remote controller 232 proceeds to step 470 in a case of the forwarding function. The remote controller 232 determines call information which is requested to be barred in step 450.

The type of call barring may include an outgoing call barring, an international call barring, an incoming call barring, a roaming barring and the like. The outgoing call barring is a function of restricting a call origination, and can include one or more options depending on the setting such as the restriction for all outgoing calls or the partial restriction for outgoing calls according to a condition such as a stored telephone number. The incoming call barring is a function of restricting an incoming call, and can include one or more options depending on the setting such as the restriction for all incoming calls or the partial restriction for incoming calls according to a condition such as a stored telephone number. The international call barring is a function of restricting the placement of an international call, and the roaming barring is a function of restricting the communications with other terminals if the terminal is roaming. Such call barring can be performed within the terminal by the control of the wireless communications unit 210 of the MS1 101, or in a case where the call barring is set up, the MS1 101 provides a corresponding call barring information to the communications network through the BS1 111 of FIG. 1 in the communications network so that the call barring of the MS1 101 can be performed. The remote controller 232 sets up a requested call barring function according to the determined call information in step 460. Following this procedure, in a case where a request to receive a restricted incoming call or place a restricted outgoing call is made later, the corresponding call is restricted.

If it is determined in step 440 that a forwarding function is requested, the remote controller 232 determines information of a call or message requesting forwarding in step 470. Here, the information of the call or message may include a forwarding message type, a receiver, and caller information. The forwarding message type may include an SMS message and an MMS message. The forwarding function includes forwarding as a real-time or non-realtime service as well as forwarding of the above-described call, the SMS message, and the MMS message. Moreover, in the forwarding of the message, not only the function of requesting forwarding according to the message type, such as the SMS message, and the MMS message, but also the forwarding function according to a receiver, caller information, and the like. For example, the setting up of the forwarding function for a message received from a given receiver can be performed. Moreover, a desired forwarding function can be selected and set up among forwarding functions which are variously classified according to the setting such as the forwarding function setting of the messages which are previously received and stored or the forwarding function setting of messages which are received later. The remote controller 232 sets up the forwarding function according to determined forwarding information in step 480.

At this time, in a case where the set message forwarding function includes the forwarding function for messages which are previously received, the remote controller 232 sets up the forwarding function at step 480 and transmits the messages which are previously received to the recipient, that is, the MS2 102. In a case where the forwarding function is set up for messages which are received later, the MS1 101 sets up the forwarding function at step 480, and forwards the received call or message to the recipient, that is, the MS2 102, when the message or call corresponding to the type which is set up later, that is, an event corresponding to the set up forwarding function is generated.

Figure 5:
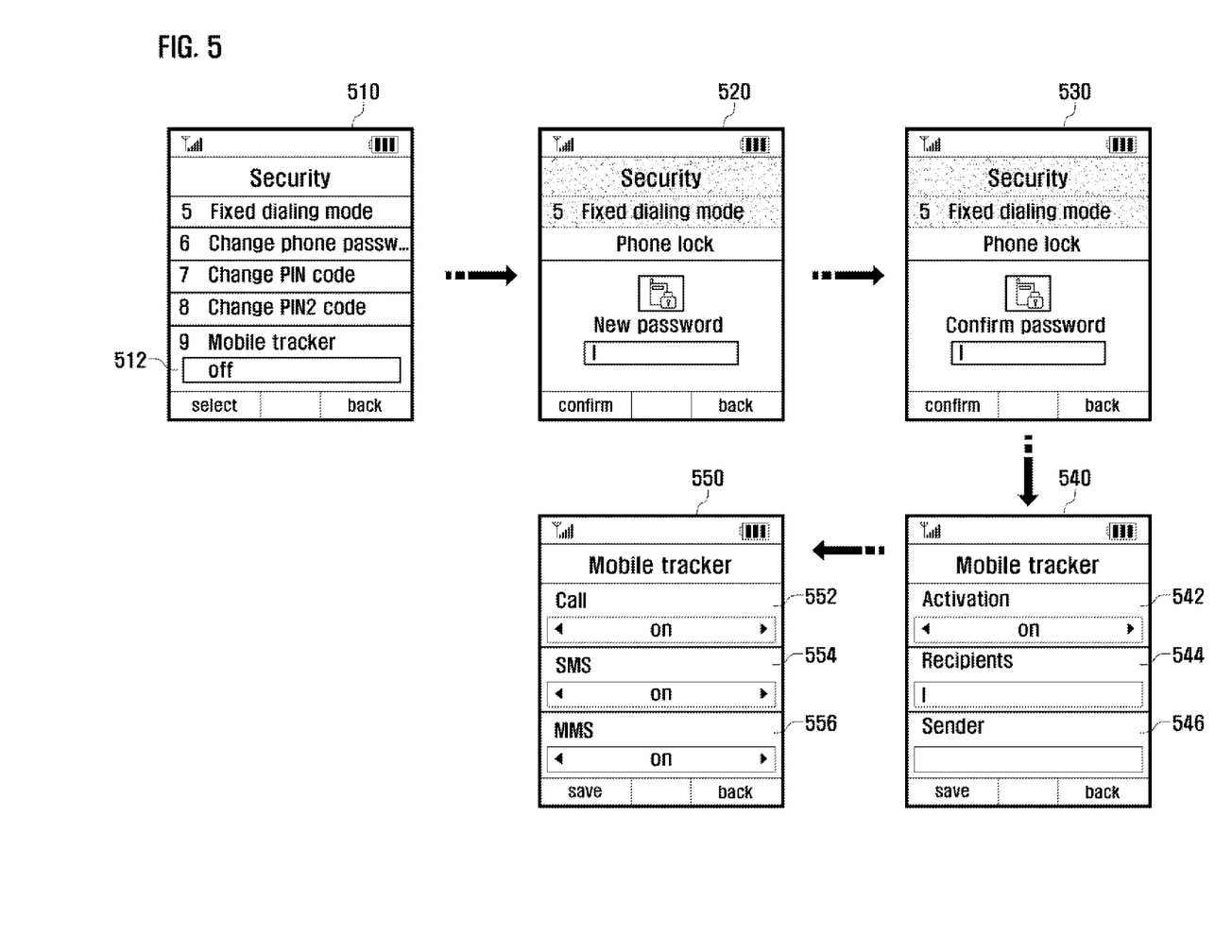
FIG. 5 is an exemplary diagram of screens illustrating a procedure for setting up a remote control function in a slave terminal according to an exemplary embodiment of the present invention.

FIG. 5 is an exemplary diagram of screens illustrating a procedure for setting up a remote control function in a slave terminal according to an exemplary embodiment of the present invention. FIG. 5 illustrates a procedure for setting up a remote control function in a remote controlled slave terminal, for example MS1 101 of FIGS. 1 and 3.

Referring to FIG. 5, in a case of setting the remote control function in the MS1 101 of FIGS. 1 and 3, a "security" menu is displayed on the display unit 250 of FIG. 2 such as a screen 510. On the screen 510, if the remote control function, for example, "the mobile tracker" function 512 is selected, the screen 510 is altered to a password input screen 520 such that a password, which may be used later for authentication of the mobile tracker function, can be input. On the screen 520, if a password is input through the input unit 260, the screen 520 is altered to a screen 530 requesting that the password be re-input to confirm the password identification. In an exemplary implementation, the password re-input screen can be omitted. The password set up like this may be used for determining the coincidence of a password provided from the MS2 102 in an authentication step (i.e., step 340 of FIG. 3). If the password re-input is completed, the screen 530 is altered to a screen 540 to receive the 'on' selection 542 of 'mobile tracker' function, 'recipient' information 544 such as a telephone number, and 'sender' information 546 such as a telephone number. Here, the information of preset mobile tracker function, that is, the information of the activation of the remote control function (i.e., recipient and sender information) is used when the operation of the remote control processes for functions in FIGS. 3 and 4 is determined.

In a case where the remote control function is not activated, the MS1 101 does not perform the processes of FIG. 3. In a case where preset recipient information does not coincide with the information of a terminal which requests the remote control, that is, the information of the MS2 102, the function set-up process of FIG. 4 is not performed and a message indicating that a remote control set-up cannot be attained is transmitted. A screen 550 illustrates a screen for setting up the forwarding function. That is, screen 550 illustrates a screen in which the type of the forwarded call or message can be selected or set up. The screen 550 illustrates the case of setting up the forwarding function for the call 552, the SMS message 554 and the MMS message 556 among real-time or non-realtime services. In a case where it is set up as illustrated on screen 550, the remote control for one or more functions is possible among the functions of call, SMS message and MMS message when the remote control for the forwarding function is requested from the master terminal. That is, when the information included with a remote control function request (i.e., at step 420 of FIG. 4) is compared with preset remote control function information, in case it is set up as illustrated in screen 550, if one or more functions is requested, for example the SMS message and the MMS message as a requested remote control function, it is determined that the requested information coincides with preset information.

Figure 6:
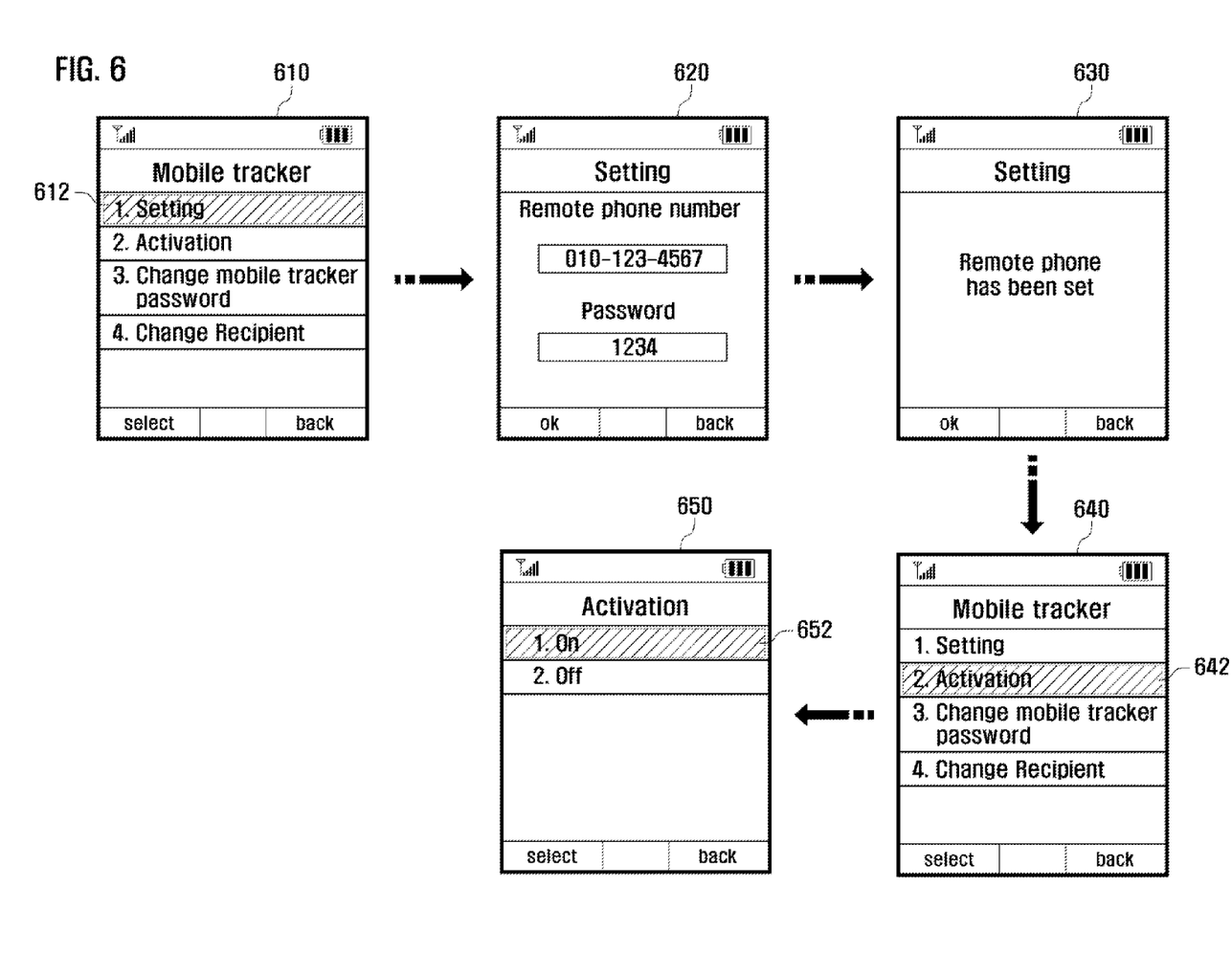
FIG. 6 is an exemplary diagram of screens illustrating a procedure for setting up a remote control function according to another exemplary embodiment of the present invention.

FIG. 6 is an exemplary diagram of screens illustrating a procedure for setting up a remote control function according to another exemplary embodiment of the present invention.

Referring to FIG. 6, in a case of setting the remote control function in the MS1 101 of FIGS. 1 and 3 which is a slave terminal, if the remote control function, for example, the mobile tracker function is selected, it is displayed on the display unit 250 of FIG. 2 like as on screen 610. If a 'settings' menu 612 is selected on the screen 610, it is altered to a screen 620 to which recipient information and password are input. If the recipient information, that is, a remote phone number and a password for the authentication are input through the input unit 260 on the screen 620, the "remote phone has been set" for the mobile tracker function is displayed as on screen 630. Here, for the accuracy of setting, after the setting is completed as illustrated on the screen 630, the MS1 101 can additionally perform the process of transmitting a message which informs that it is set up as a receiving side of the mobile tracker function to the recipient, that is, the MS2 102. Moreover, if the message is transmitted to the recipient, the MS1 101 can receive a response message from the recipient in response to the transmission. If the setting of the recipient is completed, it is altered to a screen 640. If the menu 'activation' 642 is selected on the screen 640 through the input unit 260, it is altered to a screen 650 which selects the activation of the remote function. If the menu 'on' 652 which commands the activation of remote control function is selected through the input unit 260 on the screen 650, the setting of the remote control function is completed. In the illustrated example, it is assumed that the remote control function is set up by a setup procedure as described with reference to FIG. 5 or FIG. 6 in the MS1 101 of FIG. 1, while the recipient is set with the MS2 102. Moreover, the state where the remote control function is "on" at step 310 of FIG. 3 means the state where the remote control function is "on" like the screen 650 after the remote control function is set up in the MS1 101 through a setup procedure like FIG. 6.

Figure 7:
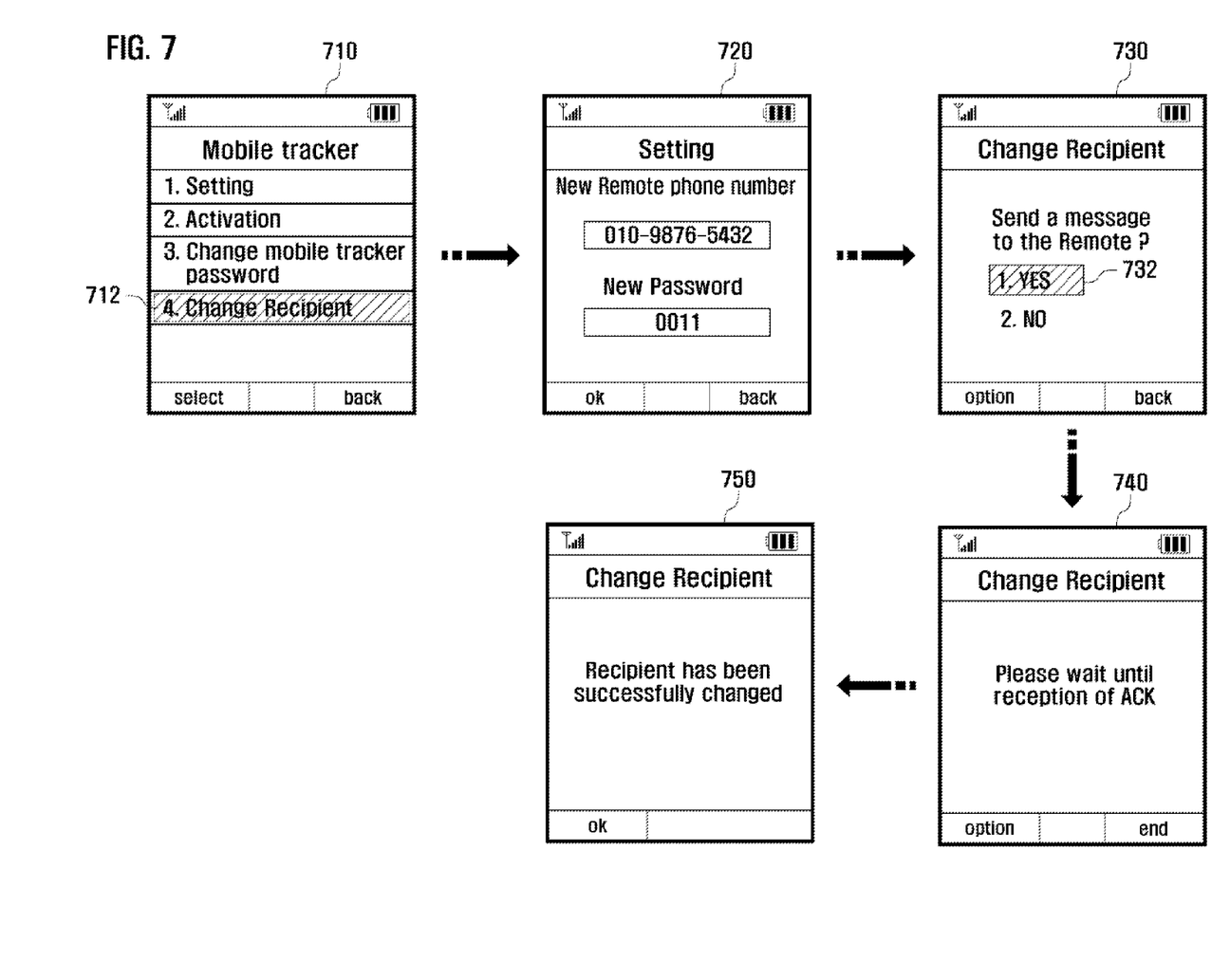
FIG. 7 is a drawing illustrating a procedure for changing recipient information among remote function setup information according to an exemplary embodiment of the present invention.

FIG. 7 is a drawing illustrating a procedure for changing recipient information among remote function setup information according to an exemplary embodiment of the present invention.

FIG. 7 illustrates a remote control function setup procedure when 'change recipient' menu is selected on the screen 610 of FIG. 6. This change recipient operates to change information of the recipient while maintaining remote function setup information in a case where the recipient is changed after the remote control function is set up through the process of FIG. 5 or FIG. 6.

Referring to FIG. 7, if 'change recipient' 712 is selected on a screen 710 during set up of a remote control function for an MS which is a slave terminal (i.e., the MS1 101 of FIGS. 1 and 3), a screen 720 is displayed on a display unit of the MS (i.e., display unit 250 of FIG. 2). On the screen 720, new recipient information and new password are input. The recipient information can be a new remote phone number. If the new recipient information and the new password are input to the screen 720, it is altered to a screen 730 which inquires whether a confirmation message should be transmitted to the changed recipient. If the confirmation message transmission (YES)

732 to the changed recipient is selected on the screen 730, the MS transmits a message which informs that the recipient information is altered to a given format to the new recipient. The MS stands-by for a response message (Acknowledge) from the new recipient as illustrated on screen 740 after the transmission of the confirmation message. If the response message (Acknowledge) is received, the alteration completion of the recipient information is displayed as illustrated on screen 750. In this way, information which can be easily altered, for example the recipient information, can be simply altered without changing all settings of the remote control function.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for remotely controlling a function of a remote controlled terminal, the method comprising:
receiving, by a remote controlled terminal, a set up request message for remote control function from a remote controlling terminal;
setting up a remote control function according to an outcome authentication of the set up request message;
receiving, when the remote control function corresponds to a recipient change function, new recipient information from the remote controlling terminal;
changing a recipient information of the remote controlled terminal to the received new recipient information;
after changing the recipient information, transmitting a confirmation message to a terminal associated with the new recipient information; and
transmitting an event information to the terminal associated with the new recipient information, when an event related to a recipient of the remote controlled terminal is generated.

2. The method of claim 1, wherein the remote control function comprises at least one of a call barring function and a forwarding function.

3. The method of claim 2, wherein the forwarding function comprises at least one of a call forwarding function and a message forwarding function.

4. The method of claim 3, wherein the message forwarding function comprises at least one forwarding function from among all Short Message Service (SMS) message forwarding functions, a partial SMS message forwarding function, all Multimedia Messaging Service (MMS) message forwarding functions and a partial MMS message forwarding function.

5. The method of claim 1, further comprising:
authenticating the received request by comparing a password stored in the remote controlled terminal with a password provided from the remote controlling terminal requesting the remote control function.

6. The method of claim 1, wherein the remote control function comprises a mobile tracker function.

7. The method of claim 1, further comprising:
receiving new information and a new remote control password; and
replacing the stored information and the remote control password with the new information and the new remote control password.

8. A system for remotely controlling a function of a remote controlled terminal, the system comprising:
a remote controlled terminal for receiving a set up request message for remote control function from a remote controlling terminal, for setting up a remote control function according to an outcome authentication of the set up request message, for receiving, when the remote control function corresponds to a recipient change function, new recipient information from the remote controlling terminal, for changing a recipient information of the remote controlled terminal to the received new recipient information, for, after changing the recipient information, transmitting a confirmation message to a terminal associated with the new recipient information, and for transmitting an event information to a terminal related to the new recipient information, when an event related to a recipient of the remote controlled terminal is generated; and
the remote controlling terminal for remotely controlling a set up of the remote control function of the remote controlled terminal.

9. The system of claim 8, wherein the remote controlled terminal comprises:
a wireless communications unit for communicating with the remote controlling terminal;
a storage unit for storing at least one of remote controlling terminal information, a remote control password, and information for the set up of the remote control function; and
a controller for analyzing a message received from the remote controlling terminal, for authenticating the remote controlling terminal, for determining whether the request for set up of remote control function based on the at least one function is received from the remote controlling terminal, and whether an event related to the remote control function is generated, and for performing the remote control function according to the generated event.

10. The system of claim 9, wherein the remote control function comprises at least one of a call barring function and a forwarding function.

11. The system of claim 10, wherein the forwarding function comprises at least one of a call forwarding function and a message forwarding function.

12. The system of claim 11, wherein the message forwarding function comprises at least one forwarding function from among all Short Message Service (SMS) message forwarding functions, a partial SMS message forwarding function, all Multimedia Messaging Service (MMS) message forwarding functions and a partial MMS message forwarding function.

13. The system of claim 9, wherein the controller authenticates the remote controlling terminal by determining whether the stored password coincides with a password provided from the remote controlling terminal.

14. The system of claim 9, wherein the controller, if new remote controlling terminal information and a new remote control password is input, replaces the stored remote controlling terminal information and the remote control password with the new remote controlling terminal information and the new remote control password.

15. The system of claim 8, wherein the remote control function comprises a mobile tracker function.

* * * * *